United States Patent [19]

Roberts et al.

[11] Patent Number: 4,832,537
[45] Date of Patent: May 23, 1989

[54] METHOD AND APPARATUS FOR DISPENSING AND CONVEYING PLASTIC ARTICLES

[76] Inventors: John T. Roberts, 3088 Mountain View Dr., Clover, S.C. 28710; Claude E. Monsees, 80 Carowood Dr., Ft. Mill, S.C. 29715

[21] Appl. No.: 45,361

[22] Filed: May 1, 1987

Related U.S. Application Data

[60] Continuation-in-part of Ser. No. 421,859, Sep. 23, 1982, abandoned, which is a continuation-in-part of Ser. No. 733,090, May 13, 1985, abandoned, which is a division of Ser. No. 688,542, Mar. 29, 1985, Pat. No. 4,662,994.

[51] Int. Cl.⁴ .............................................. B65G 47/24
[52] U.S. Cl. ........................................ 406/87; 406/10; 406/72; 406/83; 83/98; 83/356.2; 225/103; 227/93; 227/103; 227/112; 156/256; 156/521; 493/226

[58] Field of Search ........................ 406/10, 12, 19, 20, 406/23, 24, 25, 36, 51, 72, 73, 76, 83, 86, 87, 88, 197, 198; 29/809, 430; 221/270; 156/256, 521, 552; 83/98, 356.2; 225/103; 227/93, 98, 112, 100, 103; 206/806, 345; 383/22, 23; 493/226, 926

[56] References Cited

U.S. PATENT DOCUMENTS

| 2,849,068 | 8/1958 | Frank et al. | 225/103 X |
| 4,261,098 | 4/1981 | Lincoln | 29/809 |
| 4,410,103 | 10/1983 | Fuhrmeister | 227/112 X |
| 4,469,268 | 9/1984 | Roecks | 227/112 X |
| 4,704,100 | 11/1987 | Kaufman | 493/226 X |

FOREIGN PATENT DOCUMENTS 2551688  3/1985  France ............................ 227/112

Primary Examiner—Sherman D. Basinger
Assistant Examiner—Paul E. Salmon
Attorney, Agent, or Firm—Bailey & Hardaway

[57] ABSTRACT

A method and apparatus wherein individual plastic articles are sheared from a cartridge of such articles and conveyed pneumatically through a pneumatic conduit to a desired position.

2 Claims, 3 Drawing Sheets

METHOD AND APPARATUS FOR DISPENSING AND CONVEYING PLASTIC ARTICLES

This application is a continuation-in-part of application Ser. No. 421,859, filed 09/23/82, now abandoned and also a continuation-in-part of application Serial No. 06/733,090, filed 05/13/85, now abandoned, which in turn is divisional application Ser. No. 688,542, filed 03/29/85, which is now U.S. Pat. No. 4,662,974 issued 5-5-87.

BACKGROUND OF THE INVENTION

This invention relates generally to the art of dispensing and more particularly to an apparatus for dispensing and conveying plastic articles.

Dispensing of articles in automatic fashion has been of significant interest in the transition from manual processing to machine processing of various items. Dispensing techniques have been particularly well-developed in the area of packaging. Examples of such technology include the automatic dispensing of plastic bags, one at a time, by having such bags arranged in a shingled relationship along a one another utilizing heat seals between individual bags. The overall object of such arrangement is to facilitate the dispensing of such bags utilizing automated equipment.

Associated with such technology in the packaging art are various items of rigid or semi-rigid plastic material which must be dispensed one at a time in order to have some association with a bag or a packaged article.

One such device is described in U.S. Pat. No. 3,270,874 to Hilton, where individual plastic bag closures such as the type normally used on bread packages are arranged together in a unitary, side-by-side relationship with scores between individual articles to facilitate the severance of individual articles from the unitary strip. Such articles are severed by merely bending the strip at the point of score. This product is arranged primarily for manual dispensing.

A dispensing mechanism is described in U.S. Pat. No. 2,939,147 to Jacobson, wherein curtain hooks are arranged for automatic dispensing, one at a time, such that the clips are stacked together and connected together by a spline which maintains the hooks in the stacked relationship, and facilitates loading into a magazine where they are dispensed one at a time from the stack.

Another dispensing device is described in U.S. Pat. No. 3,165,968 to Anstett wherein a plastic nailing strip is utilized to connect together individual nail articles for the purpose of dispensing the articles one at a time with automated equipment. A similar device is described in U.S. Pat. No. 3,357,761 to Lagas et al.

In facilitating the marketing of retail items, it has been known in the prior art to utilize rigid thermoplastic hooks or hanger attachments to individual articles for displaying such articles in a retail environment. In the past such hooks have been dispensed from a loose cartridge for stapling or other means of attachment to a marketable item. Such individual hooks have been arranged within magazines manually in loose stacks. Such arrangement has required great skill on the part of the operator in order to assure loading of large numbers of such hooks in a stacked relationship. Essentially, such loading requires movement of large numbers of hooks within a stack by utilizing only hand pressure at both ends to maintain the stack in alignment, while hoping that the central area of the stack did not collapse to produce a disoriented array of hooks which must be again manually restacked for purposes of loading into a dispensing magazine.

In the art of producing plastic bags with hooks therein, various devices have been utilized. Such are disclosed in U.S. Pat. Nos. 3,429,498, 3,777,970, 3,782,622, and 4,385,722.

There is disclosed in U.S. Patent No. 4,590,610 to Rhyne a process of producing a bag having a hook therein. The bag thus produced has a plurality of seals to permit article insertion and inspection.

While these processes of dispensing, conveying, and of forming bags with hooks therein are efficacious, there is significant room for advancement in the art.

SUMMARY OF THE INVENTION

It is thus an object of this invention to provide an improved process and apparatus for dispensing plastic articles.

It is a further object of this invention to provide an improved process and apparatus for dispensing and conveying such articles wherein the articles may be hooks.

It is a further and yet more particular object of this invention to provide an improved process for dispensing and conveying hooks for positioning within plastic film to form a hanging bag therefrom.

These as well as other objects are accomplished by a method and apparatus wherein individual plastic articles are sheared from a cartridge of such articles and conveyed pneumatically through a pneumatic conduit to a desired location.

DETAILED DESCRIPTION

In accordance with this invention it has been found that plastic articles may be dispensed and precisely conveyed utilizing a magazine of such articles from which the articles are sheared within a pneumatic conduit for precise positioning by conveying through the pneumatic conduit.

It has additionally been further found that the conveying force of the pneumatic conduit may be utilized to force plastic hooks to penetrate plastic film for positioning hooks within the plastic film for the formation of hanging bags from such plastic film. Various other advantages and features will become apparent from a reading of the following description given with reference to the various figures of drawing.

Figure 1:
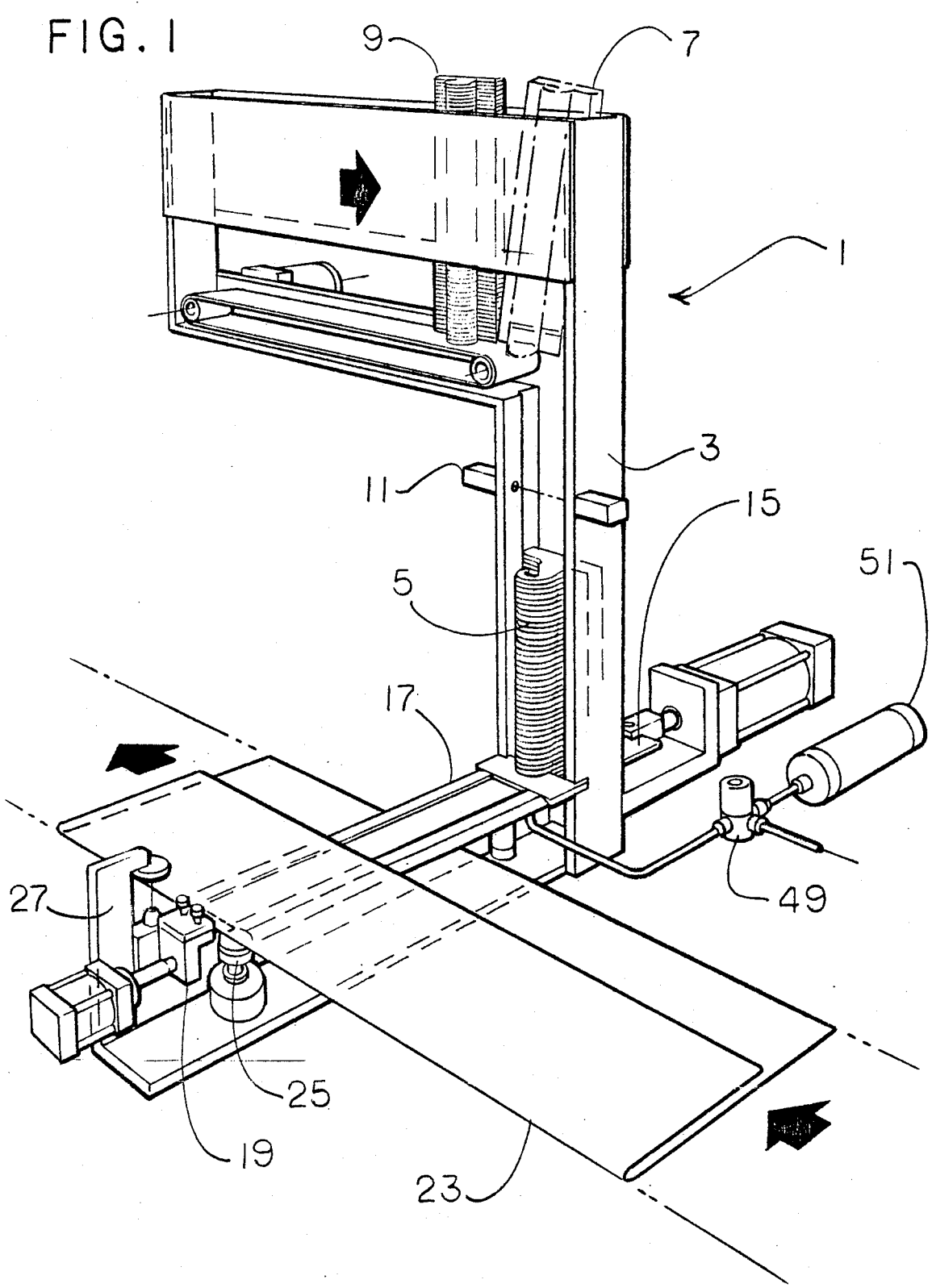
FIG. 1 of the drawings is a perspective view of the apparatus in accordance with this invention.

FIG. 1 of the drawings illustrates an apparatus 1 in accordance with this invention. Generally, the apparatus comprises a magazine 3 for retaining a cartridge 5 of individual plastic articles. Preferably the cartridge 5 is of the type described in my copending applications wherein the individual plastic articles are fused to form a cartridge for dispensing purposes. Additional cartridges 7 and 9 are illustrated as replacements when detection means 11 detects that cartridge 5 has been depleted to the extent that it is below the detection means 11. Magazine 3 is associated with a shearing blade 15 which will be further described below. Blade 15 shears individual articles from the bottom of cartridge 5 for positioning within pneumatic conduit 17. The individual articles traverse the length of pneumatic conduit 17 and are received by receiving means 19 at the other end of conduit 17.

Figure 4:
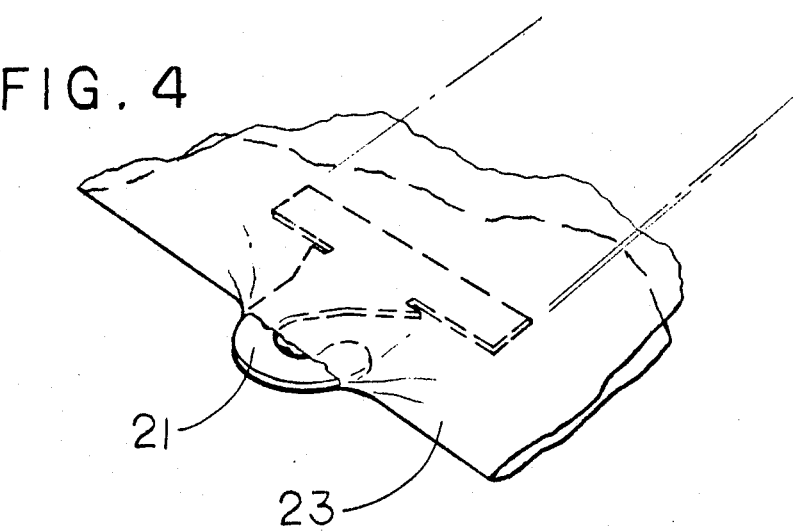
FIG. 4 is a partial breakaway perspective view illustrating a portion of the process of this invention.

As illustrated in FIG. 1 it is seen that a plastic film is folded about conduit means 17 for receiving the individual plastic articles as they are received by receiving means 19. As best illustrated in FIG. 4, an individual plastic hook 21 penetrates plastic film 23 as it leaves the conduit 17. Also illustrated in FIG. 1 is a film restrainer 25 which contacts the bottom of film 23 as an individual hook 21 penetrates film 23 so as to restrain the film from the force of the penetrating hook 21. The apparatus further comprises means 27 for detecting the precise location of the edge of film 23 for alignment purposes.

Further description will now be given with reference to the dispensing and conveying of the individual articles through the conduit means 17. This is best illustrated in FIGS. 2 and 3 of the drawings.

Figure 2:
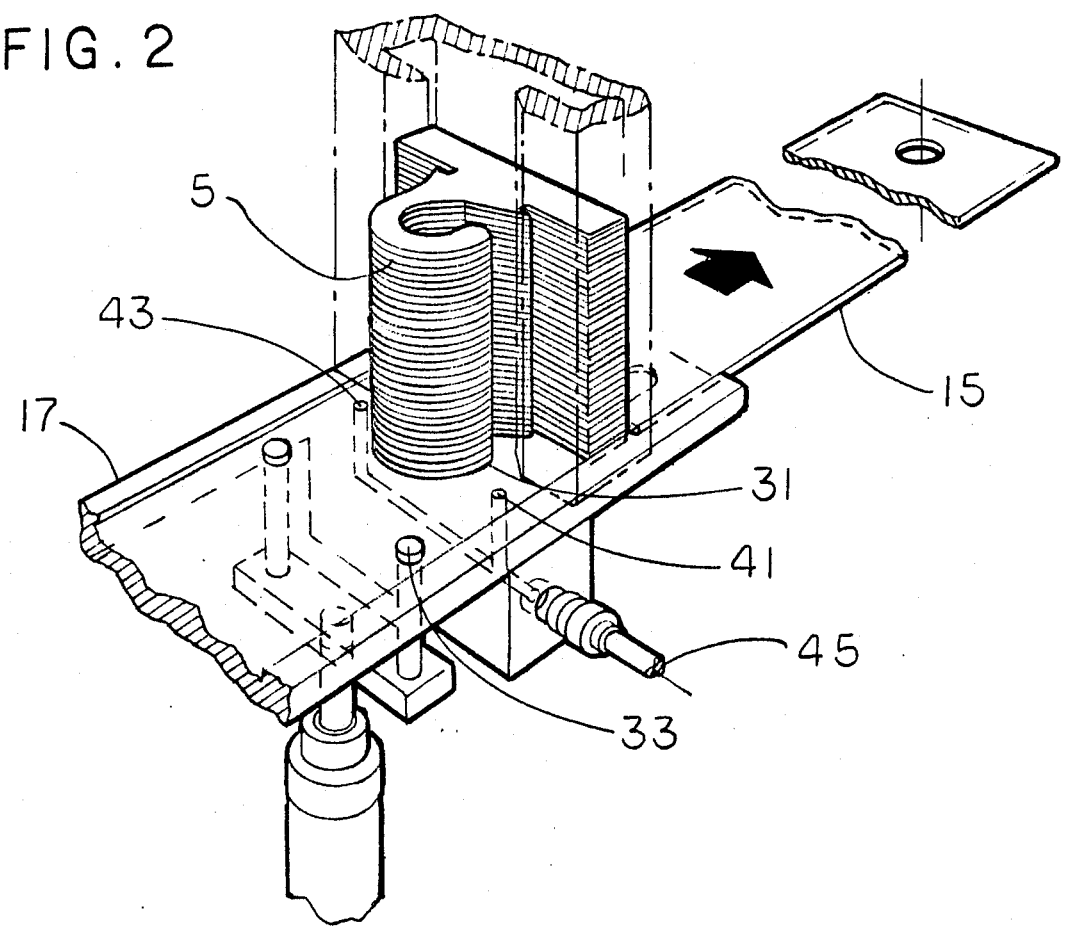
FIG. 2 of the drawings is a cutaway perspective view of a portion of FIG. 1.

As illustrated in FIG. 2 of the drawings, shear blade 15 is illustrated in the retracted position. It is seen that it is in contact with the bottom article 31 of cartridge 5. Upon actuation of shear blade 15, article 31 moves to the position illustrated in FIG. 3. Restraining means 33 restrain article 31 (now sheared from the cartridge 5) from further movement. Shear blade 15 has slots 35 and 37 therein which define a space in fluid communication with a source of pressurized gas such as air through ports 41 and 43. It is seen that ports 41 and 43 communicate through conduit 45 back through valve 49 to a source of pressurized gas 51 as best illustrated in FIG. 1.

Figure 3:
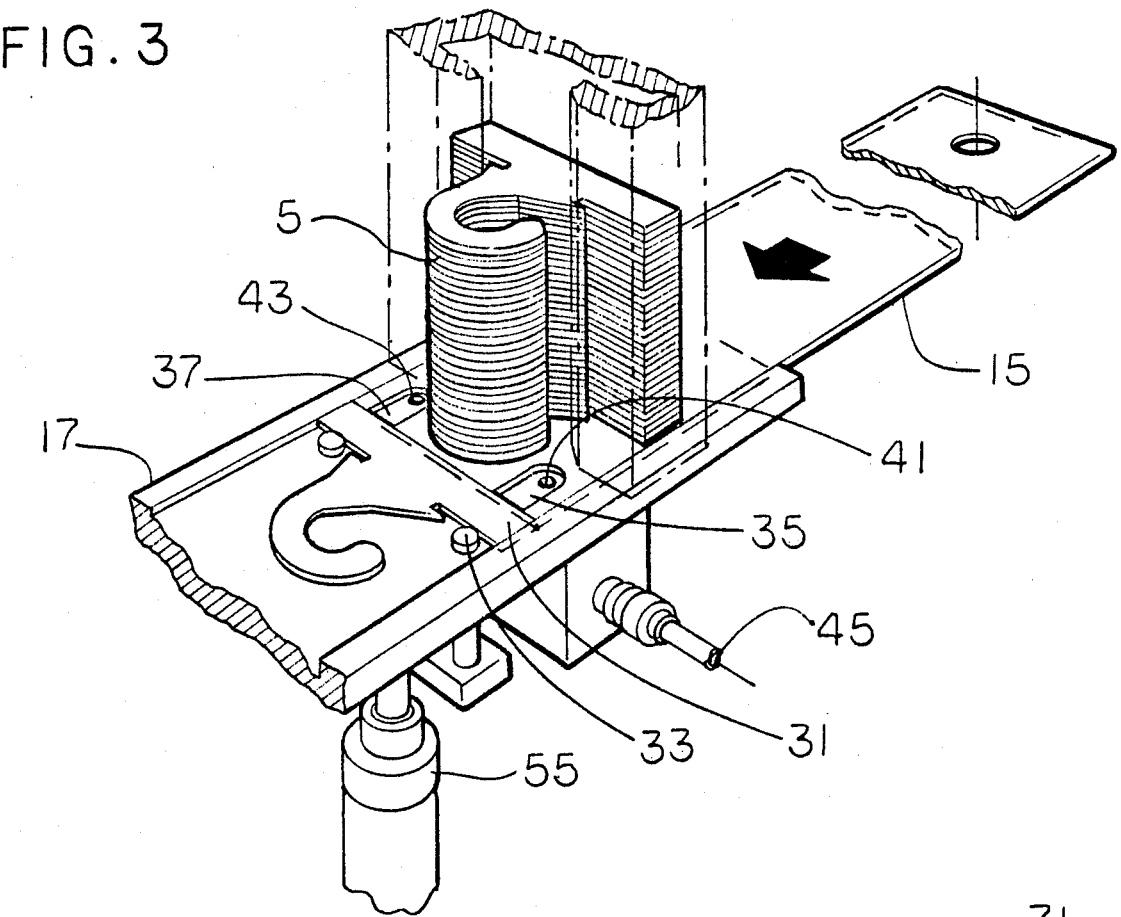
FIG. 3 is a view similar to FIG. 2 in a different sequence of operation.

Upon positioning of article 31 as it appears in FIG. 3, pressurized gas is forced through ports 41 and 43 whereupon restraining means 33 are lowered by actuator 55 thus releasing article 31.

Figure 5:
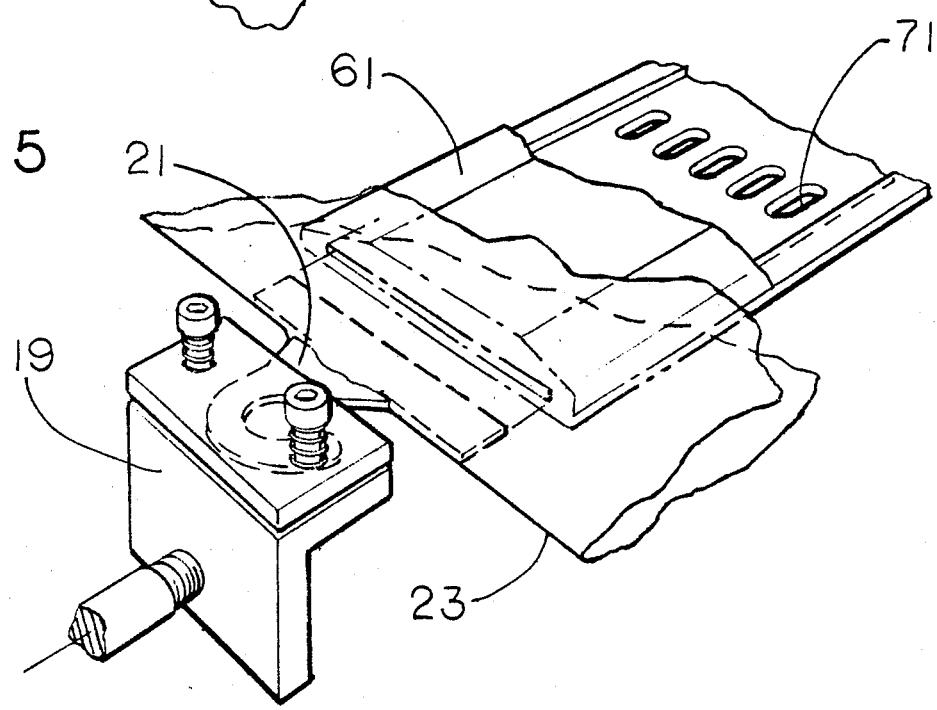
FIG. 5 is a view similar to FIG. 4 illustrating the apparatus components not shown in FIG. 4.

As illustrated in FIGS. 1, 2 and 3, conduit means 17 appears open but in actuality a transparent cover 61 as illustrated in FIG. 5 is utilized to define a space through which the pneumatic action occurs to convey individual articles through such space. The use of a transparent cover has been found beneficial for observation of operation of the device and for quickly observing any jams which may occur.

After article 31 has been appropriately dispensed, it is seen that magazine 5 simply by the force of gravity drops to the dispensing position when shear blade 15 is retracted. The process is repeated utilizing any timing which is deemed desirable for the particular process.

The preferred embodiment of this invention is directed to the dispensing and conveying of individual hooks such as 31 for placement in plastic film such as 23 for production of hanging bags by further processing of the plastic film. It is readily apparent that a variety of shapes and configurations may be produced.

FIG. 4 of the drawings illustrates receipt of an individual hook 21 in film 23 due to the force provided to the individual article upon being conveyed through pneumatic conduit 17. FIG. 5 of the drawings illustrates in phantom and in greater detail the receiving means 19 which receive hook 21 as it penetrates film 23. Also illustrated in FIG. 5 of the drawings are a plurality of orifices 71 which upon passage of article 21 pass said orifices act as vents for the pressurized fluid and reduce the pressure on the article at that point.

It is thus seen that the process and apparatus of this invention provide a novel and advantageous process and apparatus for dispensing and conveying plastic articles. It is further seen that the process and apparatus provide a unique and novel technique for the insertion of hooks into plastic film. As various other advantages and features will be apparent to those of skill in the art from a reading of the foregoing description which is exemplary in nature, such variations are included within the spirit and scope of the invention as defined by the following appended claims.

That which is claimed is:

1. A process for dispensing rigid or semi-rigid plastic articles in seriatim order, comprising the steps of:
   providing a stacked cartridge of said articles, said articles adhered to one another to form said cartridge;
   shearing one of said articles from said cartridge;
   receiving said one article in a pneumatic conduit;
   transporting said one article within said conduit by causing a pressure differential therein;
   positioning a folded plastic film at the end of said pneumatic conduit to receive said article as it leaves said conduit; and
   said article penetrating said plastic film, positioning itself therein.

2. An apparatus for dispensing articles from a cartridge of said articles, comprising:
   a magazine for receiving said cartridge;
   means for shearing one of said articles from said cartridge;
   a pneumatic conduit for receiving said article as it is sheared;
   means for varying the pressure in said conduit for transporting said article therethrough;
   means in said pneumatic conduit for restraining movement of said article and means for removing said restraining means to permit movement of said article through said pneumatic conduit; and
   means for positioning a plastic film between said pneumatic conduit and said means for receiving said article;
   said pneumatic conduit having an entrance end where said article is received as it is sheared and an exit end and further including an orifice defined by said pneumatic conduit means near said exit end to reduce pressure on said article after passing said orifice;
   whereby said article penetrates said plastic film positioning itself therein.

* * * * *